(12) United States Patent
Cradit et al.

(10) Patent No.: US 11,428,297 B1
(45) Date of Patent: Aug. 30, 2022

(54) AXLE ASSEMBLY HAVING A GEAR REDUCTION MODULE WITH MULTIPLE GEAR SETS

(71) Applicant: ArvinMeritor Technology, LLC, Troy, MI (US)

(72) Inventors: Jeremy Cradit, Troy, MI (US); Nick Bofferding, Troy, MI (US); David Zueski, Troy, MI (US); Robert Martin, Troy, MI (US); Eric LaMothe, Troy, MI (US); Christopher Keeney, Troy, MI (US); Brian Hayes, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/308,307

(22) Filed: May 5, 2021

(51) Int. Cl.
| | |
|---|---|
| *F16H 3/64* | (2006.01) |
| *B60K 1/00* | (2006.01) |
| *F16H 37/04* | (2006.01) |

(52) U.S. Cl.
CPC ............ *F16H 3/64* (2013.01); *B60K 1/00* (2013.01); *B60K 2001/001* (2013.01); *F16H 37/042* (2013.01); *F16H 2200/0021* (2013.01); *F16H 2200/0034* (2013.01); *F16H 2200/0039* (2013.01); *F16H 2200/201* (2013.01); *F16H 2200/2007* (2013.01); *F16H 2200/2035* (2013.01); *F16H 2200/2043* (2013.01); *F16H 2200/2094* (2013.01); *F16H 2702/00* (2013.01)

(58) Field of Classification Search
CPC ..... F16H 3/64; F16H 2200/2007–2012; F16H 2200/2035; B60K 2001/001
See application file for complete search history.

(56) References Cited

U.S. PATENT DOCUMENTS

| | | | | |
|---|---|---|---|---|
| 5,443,130 | A | * | 8/1995 | Tanaka ................... H02K 7/116 180/65.6 |
| 2016/0108996 | A1 | * | 4/2016 | Ji ............................... F16H 3/66 475/275 |
| 2019/0054816 | A1 | | 2/2019 | Garcia et al. |
| 2019/0054817 | A1 | | 2/2019 | Garcia et al. |
| 2019/0054818 | A1 | | 2/2019 | Garcia et al. |
| 2019/0113119 | A1 | * | 4/2019 | Keeney ................. F16H 37/082 |
| 2020/0173494 | A1 | | 6/2020 | Smith et al. |
| 2020/0173531 | A1 | | 6/2020 | Smith |
| 2020/0173535 | A1 | | 6/2020 | Peng et al. |
| 2020/0173537 | A1 | | 6/2020 | Begov et al. |
| 2020/0173541 | A1 | | 6/2020 | Soffner et al. |
| 2020/0177049 | A1 | | 6/2020 | Raya et al. |
| 2020/0177059 | A1 | | 6/2020 | Smith et al. |

* cited by examiner

*Primary Examiner* — Ernesto A Suarez
*Assistant Examiner* — Lillian T Nguyen
(74) *Attorney, Agent, or Firm* — Brooks Kushman PC

(57) ABSTRACT

An axle assembly having a gear reduction unit that is configured to operatively connect an electric motor to a drive pinion. The gear reduction unit includes at least two gear sets. At least one clutch is engageable to provide a torque path between the electric motor and the drive pinion.

15 Claims, 10 Drawing Sheets

AXLE ASSEMBLY HAVING A GEAR REDUCTION MODULE WITH MULTIPLE GEAR SETS

TECHNICAL FIELD

This disclosure relates to an axle assembly having multiple gear sets that may operatively connect a rotor to a drive pinion.

BACKGROUND

An axle assembly having an electric motor module is disclosed in U.S. Patent Publication No. 2019/0054816.

SUMMARY

In at least one embodiment an axle assembly is provided. The axle assembly may include an electric motor, a drive pinion, a gear reduction unit, a first clutch, and a second clutch. The electric motor may have a rotor that may be rotatable about an axis. The drive pinion may extend through the rotor and may be rotatable about the axis. The gear reduction unit may include a first gear set and a second gear set. The first gear set may include a first sun gear, a first planetary ring gear, a first set of planet gears, and a first planet gear carrier. The first sun gear may be operatively connected to the rotor and may be rotatable about the axis with the rotor. The first planetary ring gear may be fixedly positioned such that the first planetary ring gear may not be rotatable about the axis. The first set of planet gears may mesh with the first sun gear and the first planetary ring gear. The first planet gear carrier may rotatably support the first set of planet gears. The second gear set may include a second sun gear, a second planetary ring gear, a second set of planet gears, and a second planet gear carrier. The second planetary ring gear may be couplable to the first planet gear carrier such that the first planet gear carrier and the second planetary ring gear may be rotatable together about the axis. The second set of planet gears may mesh with the second sun gear and the second planetary ring gear. The second planet gear carrier may rotatably support the second set of planet gears and may be rotatable about the axis. The first clutch may selectively couple the first planet gear carrier to the drive pinion. The second clutch may selectively couple the first planet gear carrier to the second gear set.

In at least one embodiment, an axle assembly is provided. The axle assembly may include an electric motor, a drive pinion, a gear reduction unit, and a first clutch. The electric motor may have a rotor that may be rotatable about an axis. The drive pinion may extend through the rotor and may be rotatable about the axis. The gear reduction unit may include a first planetary gear set and a second planetary gear set. The first planetary gear set may include a first sun gear, a first planetary ring gear, a first set of planet gears, and a first planet gear carrier. The first sun gear may be operatively connected to the rotor and may be rotatable about the axis with the rotor. The first planetary ring gear may be fixedly positioned such that the first planetary ring gear may not be rotatable about the axis. The first set of planet gears may mesh with the first sun gear and the first planetary ring gear. The first planet gear carrier may rotatably support the first set of planet gears. The second planetary gear set may include a second sun gear, a second planetary ring gear, a second set of planet gears, and a second planet gear carrier. The second set of planet gears may mesh with the second sun gear and the second planetary ring gear. The second planet gear carrier may rotatably support the second set of planet gears and may be rotatable about the axis. The first clutch may selectively couple the rotor to the second sun gear.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
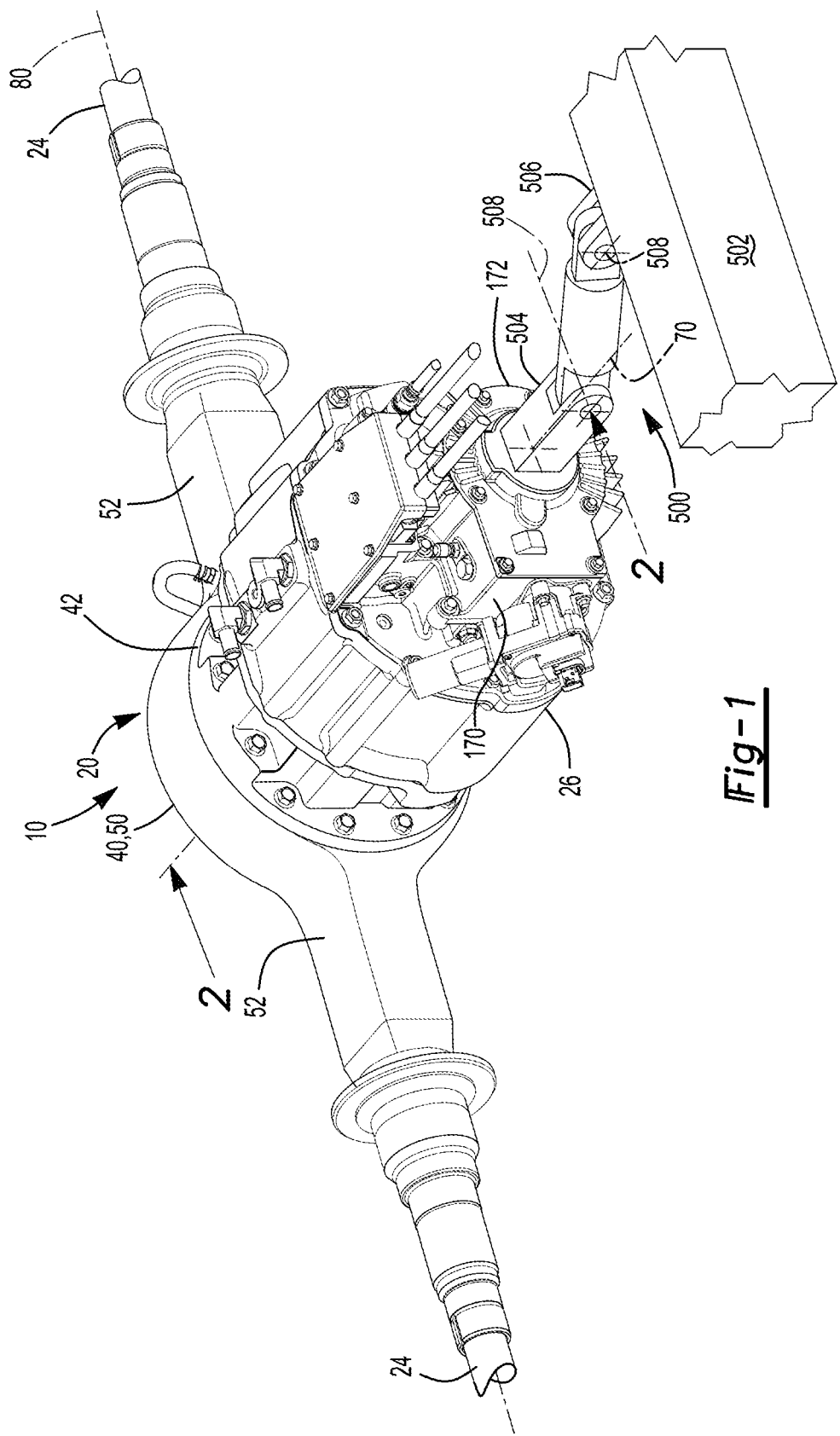
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

Figures 2, 3:
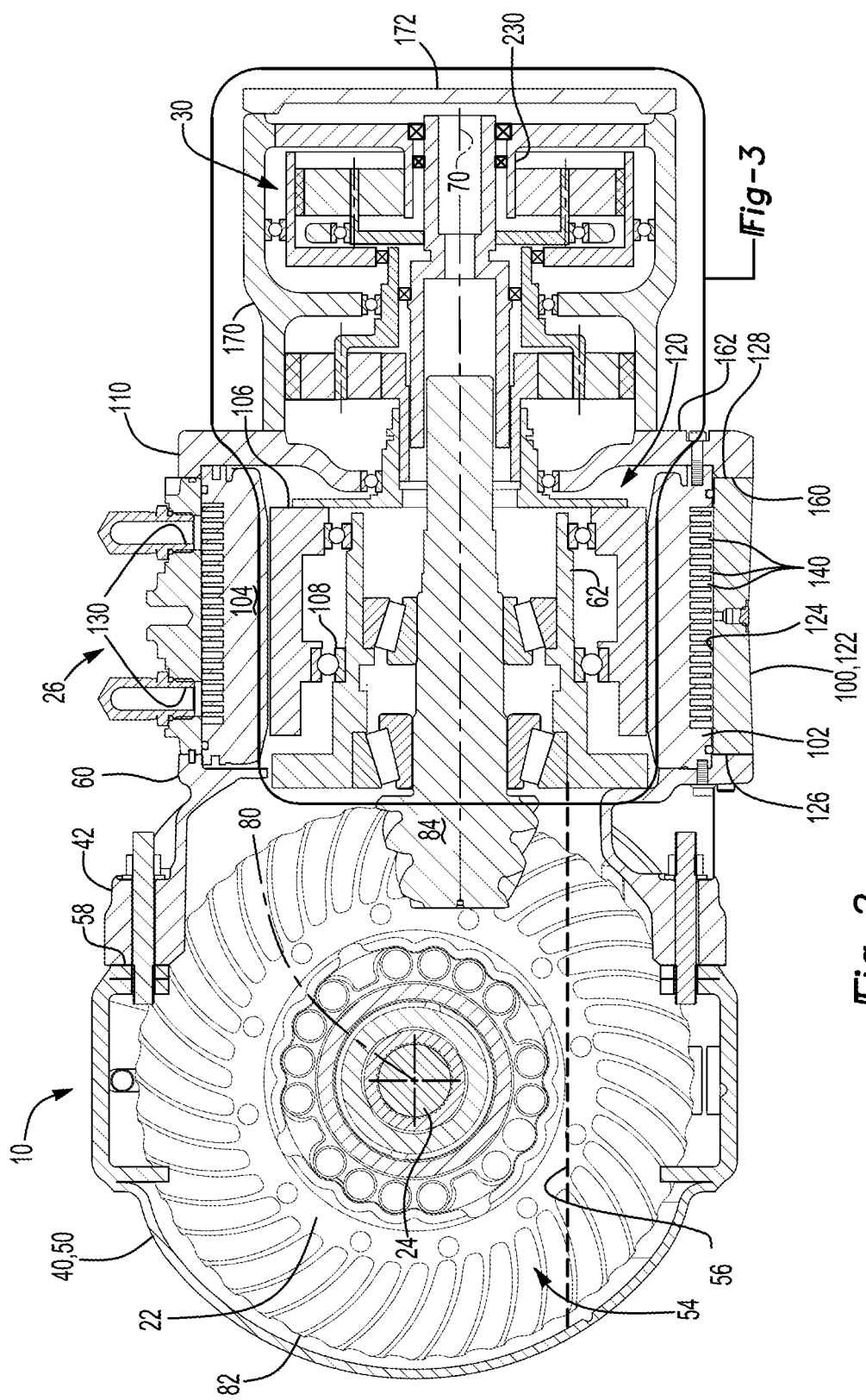
FIG. 2 is a section view of the axle assembly of FIG. 1 along section line 2-2.
FIG. 3 is a magnified view of a portion of FIG. 2 showing a gear reduction unit and a torque path associated with a first gear ratio.
Figure 3:
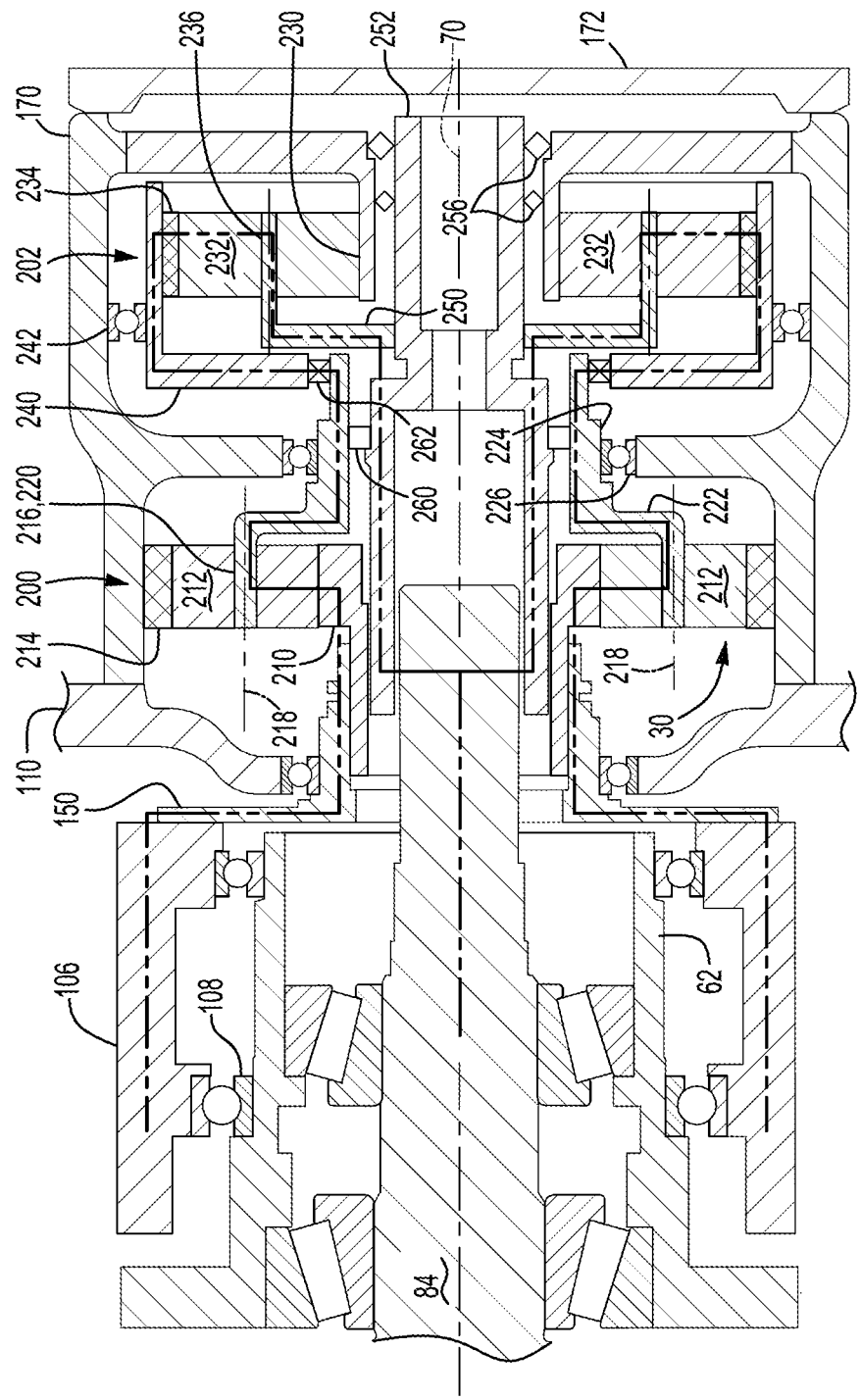

One or more axle assemblies may be provided with the vehicle. As is best shown with reference to FIGS. 1 and 2, the axle assembly 10 may include a housing assembly 20, a differential assembly 22, at least one axle shaft 24, and an electric motor module 26. As is best shown in FIG. 2, the axle assembly 10 may include a gear reduction module 30.

Housing Assembly

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

The center portion 50 may be disposed proximate the center of the axle housing 40. The center portion 50 may define a cavity that may at least partially receive the differential assembly 22. As is best shown in FIG. 2, a lower region of the center portion 50 may at least partially define a sump portion 54 that may contain or collect lubricant 56. Lubricant 56 in the sump portion 54 may be splashed by a ring gear of the differential assembly 22 and distributed to lubricate various components.

Referring to FIG. 2, the center portion 50 may include a carrier mounting surface 58. The carrier mounting surface 58 may facilitate mounting of the differential carrier 42 to the axle housing 40. For example, the carrier mounting surface 58 may face toward and may engage the differential carrier 42 and may have a set of holes that may be aligned with corresponding holes on the differential carrier 42. Each hole may receive a fastener, such as a bolt or stud, that may couple the differential carrier 42 to the axle housing 40.

Referring to FIG. 1, one or more arm portions 52 may extend from the center portion 50. For example, two arm portions 52 may extend in opposite directions from the center portion 50 and away from the differential assembly 22. The arm portions 52 may have substantially similar configurations. For example, the arm portions 52 may each have a hollow configuration or tubular configuration that may extend around and may receive a corresponding axle shaft 24 and may help separate or isolate the axle shaft 24 or a portion thereof from the surrounding environment. An arm portion 52 or a portion thereof may or may not be integrally formed with the center portion 50. It is also contemplated that the arm portions 52 may be omitted.

Referring to FIGS. 1 and 2, the differential carrier 42 may be mounted to the center portion 50 of the axle housing 40. The differential carrier 42 may support the differential assembly 22 and may facilitate mounting of the electric motor module 26. For example, the differential carrier may include one or more bearing supports that may support a bearing like a roller bearing assembly that may rotatably support the differential assembly 22. The differential carrier 42 may also include a mounting flange 60 and a bearing support wall 62.

Referring to FIG. 2, the mounting flange 60 may facilitate mounting of the electric motor module 26. As an example, the mounting flange 60 may be configured as a ring that may extend outward and away from an axis 70 and may extend around the axis 70. In at least one configuration, the mounting flange 60 may include a set of fastener holes that may be configured to receive fasteners that may secure the electric motor module 26 to the mounting flange 60.

The bearing support wall 62 may support bearings that may rotatably support other components of the axle assembly 10. For example, the bearing support wall 62 may support bearings that may rotatably support a drive pinion 84, bearings that may rotatably support a rotor of the electric motor module 26, or both. The bearing support wall 62 may extend in an axial direction away from the axle housing 40 and may extend around the axis 70. The bearing support wall 62 may define a hole that may extend along or around the axis 70 and receive the drive pinion 84 and the bearings that rotatably support the drive pinion 84. The bearing support wall 62 may be integrally formed with the differential carrier 42 or may be a separate component that is secured to or fastened to the differential carrier 42.

Differential Assembly, Drive Pinion, and Axle Shafts

Referring to FIG. 2, the differential assembly 22 may be at least partially received in the center portion 50 of the housing assembly 20. The differential assembly 22 may be rotatable about a differential axis 80 and may transmit torque to the axle shafts 24 and wheels. The differential assembly 22 may be operatively connected to the axle shafts 24 and may permit the axle shafts 24 to rotate at different rotational speeds in a manner known by those skilled in the art. The differential assembly 22 may have a ring gear 82 that may have teeth that mate or mesh with the teeth of a gear portion of the drive pinion 84. Accordingly, the differential assembly 22 may receive torque from the drive pinion 84 via the ring gear 82 and transmit torque to the axle shafts 24.

The drive pinion 84 may provide torque to the ring gear 82. In an axle assembly that includes a gear reduction module 30, the drive pinion 84 may operatively connect the gear reduction module 30 to the differential assembly 22. In at least one configuration, the drive pinion 84 may be rotatable about the axis 70 and may be rotatably supported inside another component, such as the bearing support wall 62.

Referring to FIG. 1, the axle shafts 24 may transmit torque from the differential assembly 22 to corresponding wheel hubs and wheels. Two axle shafts 24 may be provided such that each axle shaft 24 extends through a different arm portion 52 of axle housing 40. The axle shafts 24 may extend along and may be rotatable about an axis, such as the differential axis 80. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Electric Motor Module

Referring to FIG. 2, the electric motor module 26, which may also be referred to as an electric motor, may be mounted to the differential carrier 42 and may be operatively connectable to the differential assembly 22. For instance, the electric motor module 26 may provide torque to the differential assembly 22 via the drive pinion 84 and a gear reduction module as will be discussed in more detail below. The electric motor module 26 may be primarily disposed outside the differential carrier 42. In addition, the electric motor module 26 may be axially positioned between the axle housing 40 and the gear reduction module 30. In at least one configuration, the electric motor module 26 may include a motor housing 100, a coolant jacket 102, a stator 104, a rotor 106, at least one rotor bearing assembly 108, and a cover 110.

The motor housing 100 may extend between the differential carrier 42 and the cover 110. The motor housing 100 may be mounted to the differential carrier 42 and the cover 110. For example, the motor housing 100 may extend from the mounting flange 60 of the differential carrier 42 to the cover 110. The motor housing 100 may extend around the axis 70 and may define a motor housing cavity 120. The motor housing cavity 120 may be disposed inside the motor housing 100 and may have a generally cylindrical configuration. The bearing support wall 62 of the differential carrier 42 may be located inside the motor housing cavity 120. Moreover, the motor housing 100 may extend continuously around and may be spaced apart from the bearing support wall 62. In at least one configuration, the motor housing 100 may have an exterior side 122, an interior side 124, a first end surface 126, a second end surface 128, and one or more ports 130.

The exterior side 122 may face away from the axis 70 and may define an exterior or outside surface of the motor housing 100.

The interior side 124 may be disposed opposite the exterior side 122. The interior side 124 may be disposed at a substantially constant radial distance from the axis 70 in one or more configurations.

The first end surface 126 may extend between the exterior side 122 and the interior side 124. The first end surface 126 may be disposed at an end of the motor housing 100 that may face toward the differential carrier 42. For instance, the first end surface 126 may be disposed adjacent to the mounting flange 60 of the differential carrier 42. The motor housing 100 and the first end surface 126 may or may not be received inside the mounting flange 60.

The second end surface 128 may be disposed opposite the first end surface 126. As such, the second end surface 128 may be disposed at an end of the motor housing 100 that may face toward and may engage the cover 110. The second end surface 128 may extend between the exterior side 122 and the interior side 124 and may or may not be received inside the cover 110.

One or more ports 130 may extend through the motor housing 100. The ports 130 may be configured as through holes that may extend from the exterior side 122 to the interior side 124. The ports 130 may allow coolant, such as a fluid like water, a water/antifreeze mixture, or the like, to flow to and from the coolant jacket 102 as will be described in more detail below.

Referring to FIG. 2, the coolant jacket 102 may help cool or remove heat from the stator 104. The coolant jacket 102 may be received in the motor housing cavity 120 of the motor housing 100 and may engage the interior side 124 of the motor housing 100. The coolant jacket 102 may extend axially between the differential carrier 42 and the cover 110. For example, the coolant jacket 102 may extend axially from the differential carrier 42 to the cover 110. In addition, the coolant jacket 102 may extend around the axis 70 and the stator 104. As such, the stator 104 may be at least partially received in and may be encircled by the coolant jacket 102. Moreover, the coolant jacket 102 may extend in a radial direction from the stator 104 to the interior side 124 of the motor housing 100. In at least one configuration, the coolant jacket 102 may include a plurality of channels 140.

The channels 140 may extend around the axis 70 and may be disposed opposite the stator 104. The channels 140 may be configured with an open side that may face away from the axis 70 and toward the interior side 124 of the motor housing 100. Coolant may be provided to the coolant jacket 102 via a first port 130 and may exit the coolant jacket 102 via a second port 130. For instance, coolant may flow from the first port 130 into the channels 140, receive heat from the stator 104 as the coolant flows through the channels 140, and exit at the second port 130. One or more baffles may be provided with the coolant jacket 102 that may reverse or change the direction of coolant flow to help route coolant from the first port 130 to the second port 130.

The stator 104 may be received in the motor housing 100. For instance, the stator 104 may be received in the motor housing cavity 120. The stator 104 may be fixedly positioned with respect to the coolant jacket 102. For example, the stator 104 may extend around the axis 70 and may include stator windings that may be received inside and may be fixedly positioned with respect to the coolant jacket 102.

The rotor 106 may extend around and may be rotatable about the axis 70. The rotor 106 may be received inside the stator 104, the coolant jacket 102, and the motor housing cavity 120 of the motor housing 100. The rotor 106 may be rotatable about the axis 70 with respect to the differential carrier 42 and the stator 104. In addition, the rotor 106 may be spaced apart from the stator 104 but may be disposed in close proximity to the stator 104. The rotor 106 may include magnets or ferromagnetic material that may facilitate the generation of electrical current or may be induction-based. The rotor 106 may extend around and may be supported by the bearing support wall 62.

One or more rotor bearing assemblies 108 may rotatably support the rotor 106. For example, a rotor bearing assembly 108 may receive the bearing support wall 62 of the differential carrier 42 and may be received inside of the rotor 106. The rotor 106 may be operatively connected to the drive pinion 84. For instance, a coupling such as a rotor output flange 150 may operatively connect the rotor 106 to the gear reduction module 30, which in turn may be operatively connectable with the drive pinion 84.

Referring to FIG. 2, the cover 110 may be mounted to the motor housing 100 and may be disposed opposite the axle housing 40 and the differential carrier 42. For example, the cover 110 may be mounted to an end or end surface of the motor housing 100, such as the second end surface 128, that may be disposed opposite the differential carrier 42. As such, the cover 110 may be spaced apart from and may not engage the differential carrier 42. The cover 110 may be provided in various configurations. In at least one configuration, the cover 110 may include a first side 160 and a second side 162. The first side 160 may face toward and may engage the motor housing 100. The second side 162 may be disposed opposite the first side 160. The second side 162 may face away from the motor housing 100 and may be disposed opposite the motor housing 100. The cover 110 may also include or define a motor cover opening that may be a through hole through which the drive pinion 84 may extend.

Gear Reduction Module and Clutches

Referring to FIG. 2, an example of a gear reduction module 30 is shown. The gear reduction module 30 may transmit torque between the electric motor module 26 and the differential assembly 22. As such, the gear reduction module 30 may operatively connect the electric motor module 26 and the differential assembly 22.

The gear reduction module 30 may be disposed outside of the differential carrier 42 and may be primarily disposed outside of the electric motor module 26 or entirely disposed outside the electric motor module 26, thereby providing a modular construction that may be mounted to the electric motor module 26 when gear reduction is desired. For instance, the gear reduction module 30 may include a gear reduction module housing 170 that may receive gears of the gear reduction module 30. The gear reduction module housing 170 may be provided in various configurations. For instance, the gear reduction module housing 170 may be a separate component that is mounted to the cover 110 or may be integrally formed with the cover 110. The gear reduction module housing 170 may extend from the second side 162 of the cover 110 in a direction that extends away from the electric motor module 26. A gear reduction module cover 172 may be disposed on the gear reduction module housing 170 and may be removable to provide access to components located inside the gear reduction module housing 170.

The gear reduction module may be provided in various configurations and may include multiple gear sets that are operatively connected to each other. These gear sets may be configured as epicyclic gear sets in which one or more planet gears may revolve or rotate about a central sun gear. Each planet gear may be rotatable about a corresponding axis that may be positioned at a constant or substantially constant radial distance from the axis about which the central sun gear rotates. For clarity, each gear set is designated with a different name below.

Three main configurations of gear reduction modules 30, 30', 30" are described below and are best shown in FIGS. 3-10. It is to be understood that each gear reduction module configuration can be provided with an axle assembly having components as described above (e.g., with an axle assembly having a housing assembly 20, differential assembly 22, at least one axle shaft 24, electric motor module 26, drive pinion 84, a gear reduction module housing 170, etc.). Accordingly, magnified views are shown in FIGS. 3-10 to better depict each gear reduction module configuration rather than the remainder of the axle assembly. Each magnified view is a section view along the axis 70. In these figures, torque transmission paths between the electric motor module 26 and drive pinion 84 are represented by straight double-dash lines. In the configurations described below, torque transmission paths are primarily described in the context of transmitting torque from the electric motor module 26 to the drive pinion 84; however, the torque transmission paths may be bidirectional and may facilitate the transmission of torque from the drive pinion 84 to the electric motor module 26 under various operating conditions, such as during regenerative braking.

Figure 4:
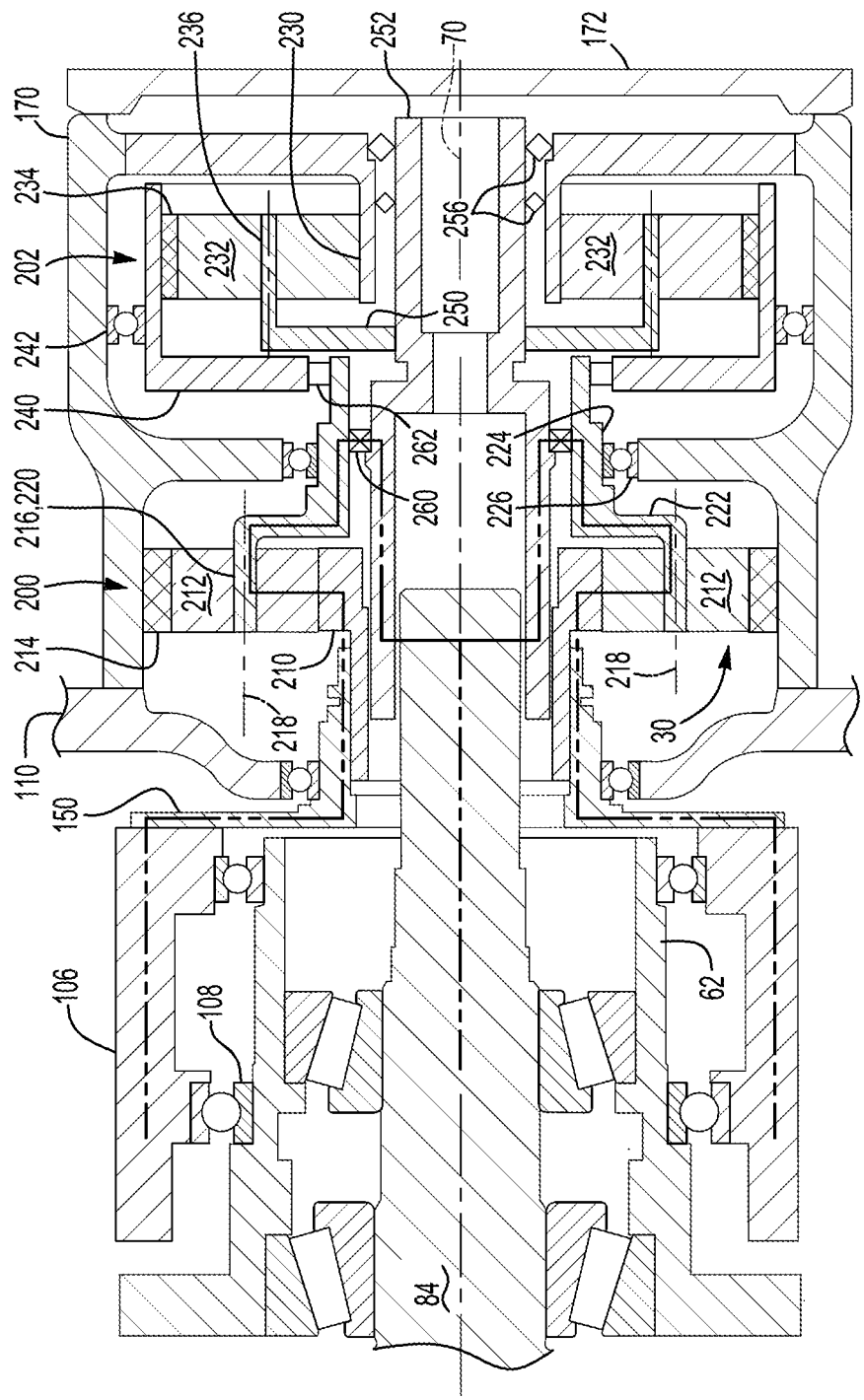
FIG. 4 shows the gear reduction unit of FIG. 2 and a torque path associated with a second gear ratio.

Referring to FIGS. 3 and 4, a first configuration of a gear reduction module 30 is shown. The gear reduction module 30 may include a first gear set 200 and a second gear set 202.

The first gear set 200 may be axially positioned along the axis 70 between the electric motor module 26 and the second gear set 202. The first gear set 200 may be configured as a planetary gear set. For instance, the first gear set 200 may include a first sun gear 210, a first set of planet gears 212, a first planetary ring gear 214, and a first planet gear carrier 216.

The first sun gear 210 may be operatively connected to the rotor 106. For instance, the first sun gear 210 may be operatively connected to the rotor 106 via the rotor output flange 150. As such, the first sun gear 210 may be rotatable about the axis 70 with the rotor 106 and the rotor output flange 150. Optionally, the first sun gear 210 may extend around and may receive the drive pinion 84.

The first set of planet gears 212 may be rotatably disposed between the first sun gear 210 and the first planetary ring gear 214. Each first planet gear 212 may have teeth that may mesh with teeth of the first sun gear 210 that may extend away from the axis 70 and with teeth of the first planetary ring gear 214 that may extend toward the axis 70. Each first planet gear 212 may be rotatable about a corresponding planet gear axis 218.

The first planetary ring gear 214 may extend around the axis 70 and may receive the first set of planet gears 212. The first planetary ring gear 214 may be fixedly positioned such that the first planetary ring gear 214 is not rotatable about the axis 70. For instance, the first planetary ring gear 214 may be received inside and may be fixedly coupled to the gear reduction module housing 170 such that the first planetary ring gear 214 may not rotate about the axis 70.

The first planet gear carrier 216 may rotatably support the first set of planet gears 212. In addition, the first planet gear carrier 216 may be rotatable about the axis 70. The first planet gear carrier 216 may extend toward and may be operatively connected to the second gear set 202. In at least one configuration, the first planet gear carrier 216 may include a support portion 220, a first flange portion 222, and a connecting portion 224.

The support portion 220 may rotatably support the first set of planet gears 212. The support portion 220 may have any suitable configuration. For instance, the support portion 220 may include a plurality of pins that may extend along each planet gear axis 218 and that may be received inside a hole in each first planet gear 212. A bearing such as a rolling element bearing assembly may be received inside the hole in each first planet gear 212 and may extend around each pin to help rotatably support each first planet gear 212.

The first flange portion 222 may extend from an end of the support portion 220 toward the axis 70. The first flange portion 222 may be axially positioned along the axis 70 between the first set of planet gears 212 and the second gear set 202.

The connecting portion 224 may extend from an end of the first flange portion 222. In at least one configuration, the connecting portion 224 may extend generally parallel to the axis 70. The connecting portion 224 may be disposed closer to the axis 70 than the support portion 220.

A support bearing assembly 226 may rotatably support the first planet gear carrier 216. The support bearing assembly 226 may extend from a support structure, such as the gear reduction module housing 170, to the first planet gear carrier 216. For instance, the support bearing assembly 226 may be received inside the gear reduction module housing 170 and the first planet gear carrier 216 may be received inside the support bearing assembly 226. The support bearing assembly 226 may be disposed proximate the connecting portion 224 of the first planet gear carrier 216 and may be axially positioned between the first flange portion 222 and the second gear set 202. As such, the support bearing assembly 226 may be axially positioned along the axis 70 between various components of the first gear set 200 and the second gear set 202.

The second gear set 202 may be operatively connected to the first gear set 200. Notwithstanding the first planet gear carrier 216, the second gear set 202 may be spaced apart from the first gear set 200. In at least one configuration, the second gear set 202 may include a second sun gear 230, a second set of planet gears 232, a second planetary ring gear 234, and a second planet gear carrier 236.

The second sun gear 230 may be fixedly positioned such that the second sun gear 230 is not rotatable about the axis 70. For instance, the second sun gear 230 may be received inside and may be fixedly coupled to the gear reduction module housing 170 such that the second sun gear 230 may not be rotatable about the axis 70.

The second set of planet gears 232 may be rotatably disposed on the second sun gear 230. Each second planet gear 232 may have teeth that may mesh with teeth of the second sun gear 230 that may extend away from the axis 70 and with teeth of the second planetary ring gear 234 that may extend toward the axis 70. Each second planet gear 232 may be rotatable about a corresponding planet gear axis that may be disposed at the same distance or a different distance from the axis 70 as the planet gear axis 218 associated with the first set of planet gears 212. In at least one configuration, members of the second set of planet gears 232 may have a larger diameter than members of the first set of planet gears 212. The second set of planet gears 232 may be rotatably supported on the second planet gear carrier 236. Each second planet gear 232 may be axially positioned between the first gear set 200 in the gear reduction module cover 172.

The second planetary ring gear 234 may extend around the axis 70 and may receive the second set of planet gears 232. The second planetary ring gear 234 may be rotatable about the axis 70 with respect to the gear reduction module housing 170. In at least one configuration, the second planetary ring gear 234 may include a connecting flange portion 240. The connecting flange portion 240 or a portion thereof may extend toward the axis 70 and the connecting portion 224 of the first planet gear carrier 216.

A second support bearing assembly 242 may rotatably support the second planetary ring gear 234. The second support bearing assembly 242 may extend from a support structure, such as the gear reduction module housing 170, to the second planetary ring gear 234. For instance, the second support bearing assembly 242 may be received inside the gear reduction module housing 170 and the second planetary ring gear 234 may be received inside the second support bearing assembly 242.

The second planet gear carrier 236 may rotatably support the second set of planet gears 232. In addition, the second planet gear carrier 236 may be rotatable about the axis 70 with the drive pinion 84. The second planet gear carrier 236 may be connected to the drive pinion 84 in any suitable manner. For instance, the second planet gear carrier 236 may include a flange portion 250 that may extend from a support member 252 that may be rotatable about the axis 70. The flange portion 250 may be coupled to or integrally formed with the support member 252. The flange portion 250 may be axially positioned between the connecting flange portion 240 of the second planetary ring gear 234 and the second set of planet gears 232.

The support member 252 may be directly or indirectly coupled to the drive pinion 84. In at least one configuration, the support member 252 may be disposed inside the second sun gear 230 and may be rotatably supported by one or more bearings 256. For instance, the bearings 256 may extend around the support member 252 and may extend from the support member 252 to the second sun gear 230. It is also contemplated that the support member 252 may be omitted, such as by increasing the length of the shaft portion of the drive pinion 84. It is also contemplated that the support member 252 may be a single unitary component or may be made up of multiple components.

In the configurations described below, one or more clutches may cooperate with the gear reduction module 30 to provide a desired gear reduction ratio and change the torque transmitted between the electric motor module 26 and the differential assembly 22, and hence to or from the axle shafts 24 of the axle assembly 10. A clutch may control rotation of one part with respect to another part. For instance, a clutch may connect and disconnect two parts, such as a driving part and a driven part. A clutch may have any suitable configuration. For instance, a clutch may be configured as a friction clutch, electromagnetic clutch, hydraulic clutch or the like. A clutch may be configured as a slip clutch or a nonslip clutch. Slip clutches may be provided in various configurations, an example of which is a multi-plate clutch.

In the figures, a clutch is represented by a square box that extends between two components. The box is checked with an X when the clutch is engaged to couple, connect, or lock the two components to each other. The box is empty and is not checked with an X when the clutch is disengaged and the two components are decoupled, disconnected, or unlocked from each other. Two rotatable components may rotate together when a clutch connects those two components and may not rotate together when a clutch does not couple or connect those two rotatable components. A rotatable component may be inhibited from rotating when a clutch connects a rotatable component to a stationary or a non-rotatable component and may be rotatable with respect to the stationary or non-rotatable component when the clutch does not couple or connect those two components. The square boxes may represent separate clutches or may represent clutches that may share a common component. For instance, a clutch that is configured as a shift collar may have teeth that may mesh with teeth of different components depending on the axial position of the shift collar. Thus, one square box may represent an approximate location where a shift collar may be coupled to or decoupled from a first component while a second square box may represent an approximate location where the shift collar may be coupled to or decoupled from a second component. A clutch may be operated or actuated with any suitable type of actuator in a manner known by those skilled in the art.

Referring to FIG. 3, two clutches are illustrated. These clutches may be referred to as a first clutch 260 and a second clutch 262.

The first clutch 260 may selectively couple the first planet gear carrier 216 to the drive pinion 84. For instance, the first clutch 260 may connect the first planet gear carrier 216 to the drive pinion 84 directly or via the support member 252 such that the first planet gear carrier 216 and the drive pinion 84 may be rotatable together about the axis 70 when the first clutch 260 is engaged. Conversely, the first clutch 260 may be disengaged to permit relative rotation between the first planet gear carrier 216 and the drive pinion 84. The first clutch 260 is illustrated as extending between the connecting portion 224 of the first planet gear carrier 216 and the support member 252; however, other configurations and positioning are contemplated. For instance, the support member 252 may be omitted and the first clutch 260 may extend from the drive pinion 84.

The second clutch 262 may selectively couple the first planet gear carrier 216 to the second gear set 202. For instance, the second clutch 262 may connect the first planet gear carrier 216 to the second planetary ring gear 234 such that the first planet gear carrier 216 and the second planetary ring gear 234 may be rotatable together about the axis 70 when the second clutch 262 is engaged. Conversely, the second clutch 262 may be disengaged to permit relative rotation between the first planet gear carrier 216 and the second planetary ring gear 234. The second clutch 262 is illustrated as extending between the connecting portion 224 of the first planet gear carrier 216 and the connecting flange portion 240 of the second planetary ring gear 234; however, other configurations and positioning are contemplated. For instance, the connecting flange portion may be provided with the first planet gear carrier 216 and the second clutch 262 may be positioned further from the axis 70 such that the second clutch 262 may connect or disconnect the connecting flange portion and the second planetary ring gear 234.

Referring to FIG. 3, clutching for providing a first gear ratio is illustrated. The first clutch 260 is disengaged and the second clutch 262 is engaged. Torque may be transmitted from the rotor 106 to the first sun gear 210 such as via the rotor output flange 150, from the first sun gear 210 to the first planet gear carrier 216 via the first set of planet gears 212, from the first planet gear carrier 216 to the second planetary ring gear 234 via the second clutch 262, from the second planetary ring gear 234 to the second planet gear carrier 236 via the second set of planet gears 232, and from the second planet gear carrier 236 to the drive pinion 84 via the support member 252, if provided. As such, the first sun gear 210 and the first planet gear carrier 216 may be rotatable about the axis 70 with respect to the drive pinion 84 when the first gear ratio is provided.

Referring to FIG. 4, clutching for providing a second gear ratio is illustrated. The first clutch 260 is engaged and the second clutch 262 is disengaged. Torque may be transmitted from the rotor 106 to the first sun gear 210 such as via the rotor output flange 150, from the first sun gear 210 to the first planet gear carrier 216 via the first set of planet gears 212, and from the first planet gear carrier 216 to the drive pinion 84 via the first clutch 260 and the support member 252, if provided. As such, torque may not be transmitted between the first gear set 200 and the second gear set 202 via the second clutch 262.

Figure 5:
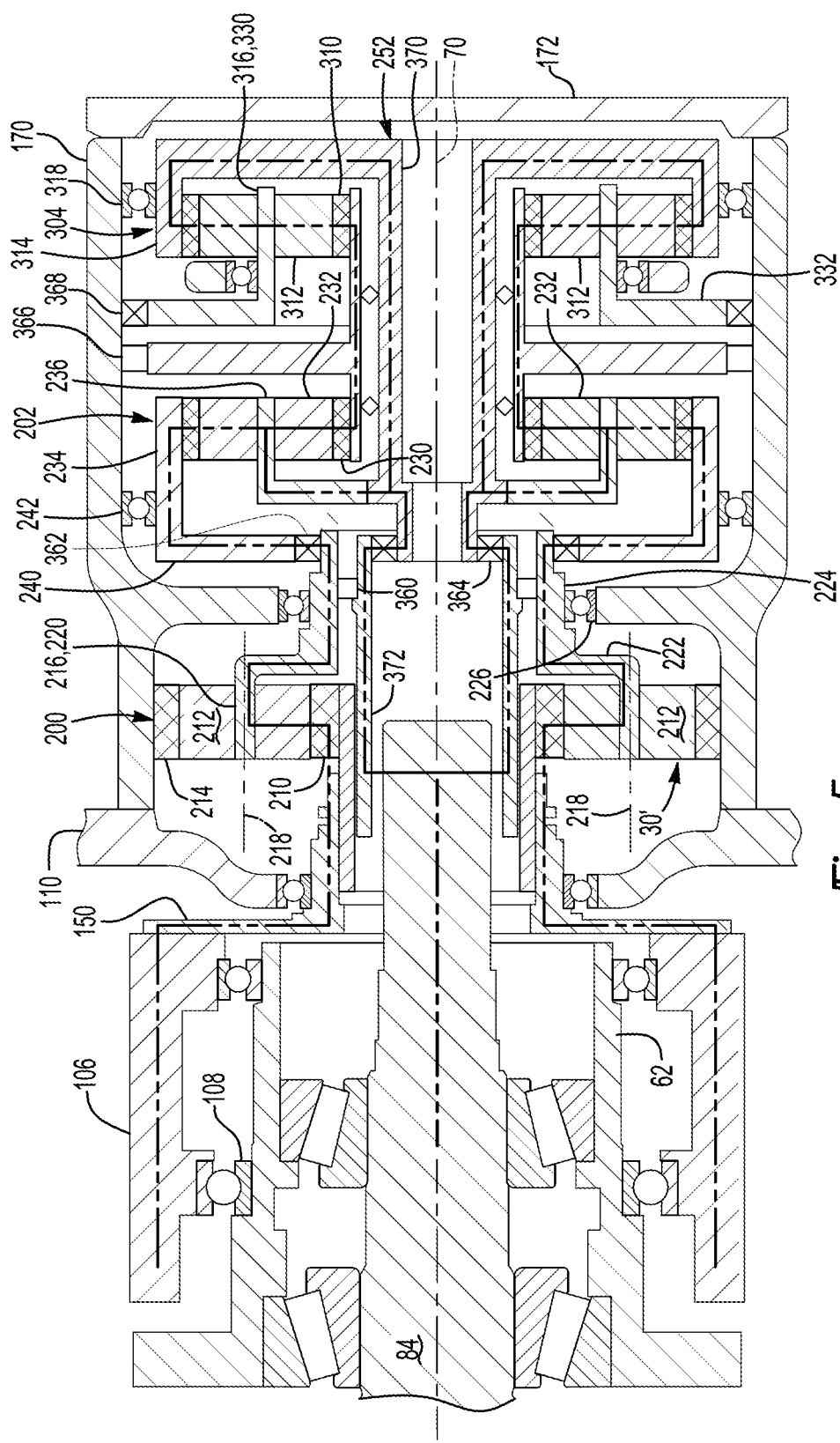
FIG. 5 is a magnified view that shows a second configuration of a gear reduction unit and a torque path associated with a first gear ratio.
Figure 6:
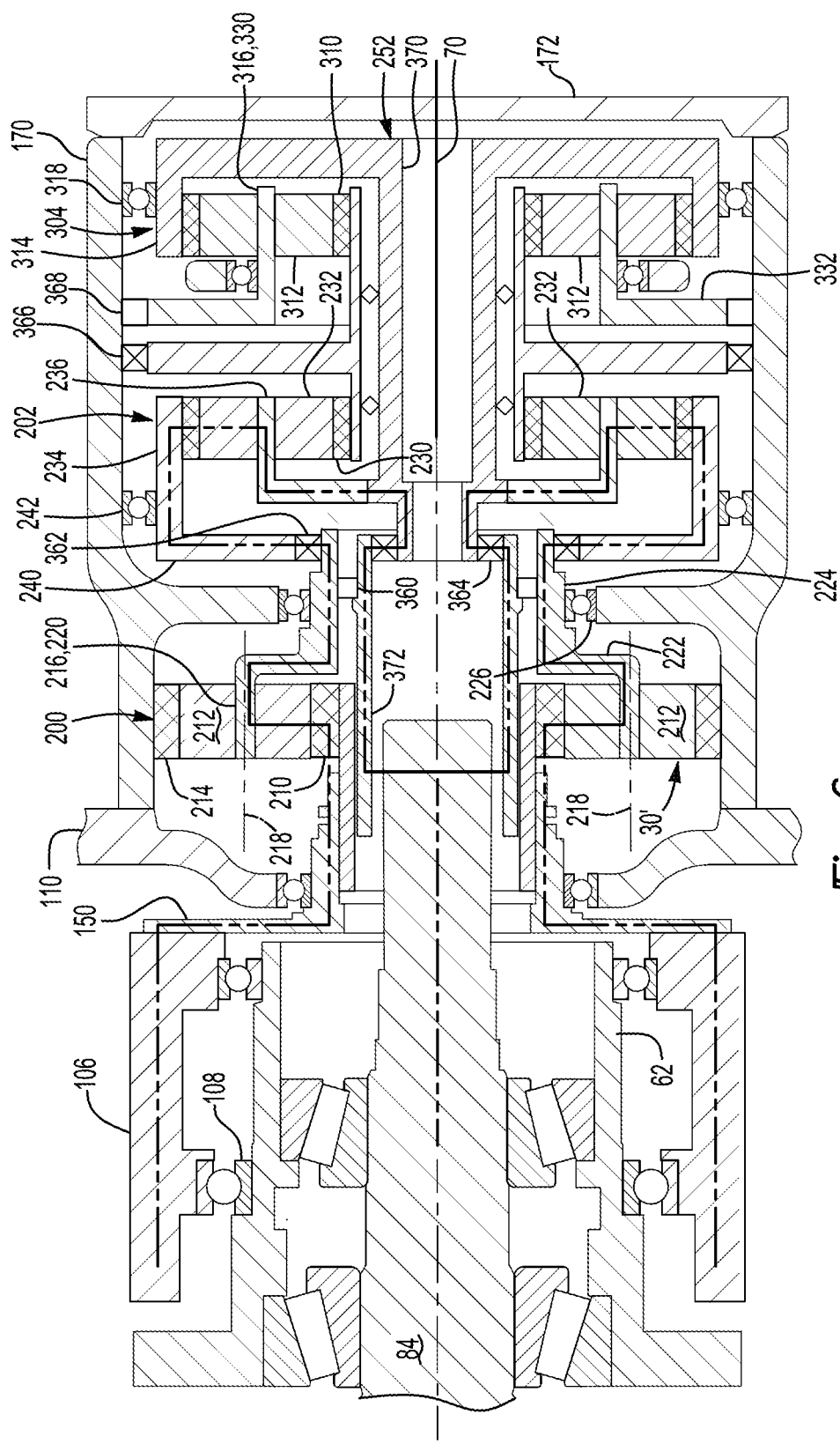
FIG. 6 shows the gear reduction unit of FIG. 5 and a torque path associated with a second gear ratio.
Figure 7:
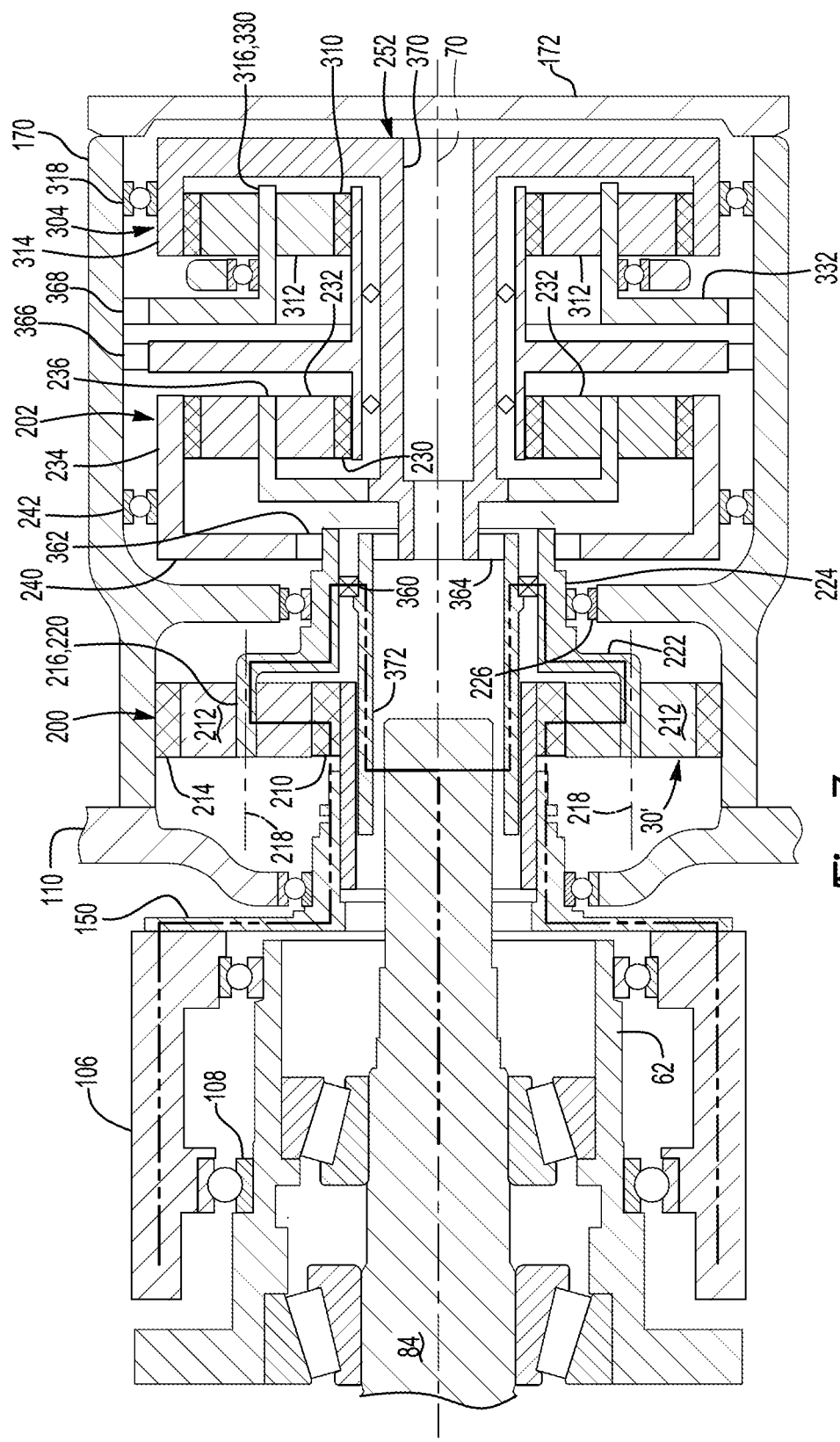
FIG. 7 shows the gear reduction unit of FIG. 5 and a torque path associated with a third gear ratio.

Referring to FIGS. 5-7, a second configuration of a gear reduction module 30' is shown. In this configuration, the gear reduction module 30' may include a first gear set 200, a second gear set 202, and a third gear set 304. The third gear set 304 may be axially positioned along the axis 70 between the second gear set 202 and gear reduction module cover 172. As such, the first gear set 200 may be axially positioned along the axis 70 between the electric motor module 26 and the second gear set 202, and the second gear set 202 may be axially positioned between the first gear set 200 and the third gear set 304.

The first gear set 200 may be the same as that previously described.

The second gear set 202 may be the same as that described above, except that the second sun gear 230 may be selectively coupled to a stationary component, such as the gear reduction module housing 170.

The third gear set 304 may be configured as a planetary gear set. For instance, the third gear set 304 may include a third sun gear 310, a third set of planet gears 312, a third planetary ring gear 314, and a third planet gear carrier 316.

The third sun gear 310 may be fixedly positioned with respect to the second sun gear 230. As such, the third sun gear 310 and the second sun gear 230 may not be rotatable with respect to each other. The third sun gear 310 may extend around and may receive the support member 252.

The third set of planet gears 312 may be rotatably disposed between the third sun gear 310 and the third planetary ring gear 314. Each third planet gear 312 may have teeth that may mesh with teeth of the third sun gear 310 that may extend away from the axis 70 and with teeth of the third planetary ring gear 314 that may extend toward the axis 70. Members of the third set of planet gears 312 may have the same diameter or a different diameter than members of the second set of planet gears 232. In the configuration shown, the second set of planet gears 232 and the third set of planet gears 312 are illustrated as having the same diameters and as being rotatable about axes that may be positioned at a common radial distance from the axis 70.

The third planetary ring gear 314 may extend around the axis 70 and may receive the third set of planet gears 312. The third planetary ring gear 314 may be rotatable about the axis 70. For instance, the third planetary ring gear 314 may be received inside and may be rotatable about the axis 70 with respect to the gear reduction module housing 170.

A third support bearing assembly 318 may rotatably support the third planetary ring gear 314. The third support bearing assembly 318 may extend from a support structure, such as the gear reduction module housing 170, to the third planetary ring gear 314. For instance, the third support bearing assembly 318 may be received inside the gear reduction module housing 170 and the third planetary ring gear 314 may be received inside the third support bearing assembly 318.

The third planet gear carrier 316 may rotatably support the third set of planet gears 312. In addition, the third planet gear carrier 316 may be selectively coupled to a stationary component, such as the gear reduction module housing 170. In at least one configuration, the third planet gear carrier 316 may include a support portion 330 and a third flange portion 332.

The support portion 330 may rotatably support the third set of planet gears 312. The support portion 330 may have any suitable configuration. For instance, the support portion 330 may include a plurality of pins that may be received inside a hole in each third planet gear 312. A roller bearing assembly may be received inside the hole in each third planet gear 312 and may extend around each pin to help rotatably support each third planet gear 312. Each pin may extend along a corresponding planet gear axis.

The third flange portion 332 may extend from an end of the support portion 330. For instance, the third flange portion may extend away from the axis 70. The third flange portion 332 may be axially positioned along the axis 70 between the second gear set 202 and the third set of planet gears 312. The third flange portion 332 may be omitted in various configurations.

Referring to FIG. 5, five clutches are illustrated. These clutches may be referred to as a first clutch 360, a second clutch 362, a third clutch 364, a fourth clutch 366, and a fifth clutch 368.

The first clutch 360 may selectively couple the first planet gear carrier 216 to the drive pinion 84, such as via the support member 252, in the same manner as the first clutch 260 previously described. As such, the first planet gear carrier 216 and the drive pinion 84 may be rotatable together about the axis 70 when the first clutch 360 is engaged. Conversely, the first clutch 360 may be disengaged to permit relative rotation between the first planet gear carrier 216 and the drive pinion 84.

The second clutch 362 may selectively couple the first planet gear carrier 216 to the second gear set 202 in the same manner as the second clutch 262 as previously described. As such, the first planet gear carrier 216 and the second planetary ring gear 234 may be rotatable together about the axis 70 when the second clutch 262 is engaged. Conversely, the second clutch 262 may be disengaged to permit relative rotation between the first planet gear carrier 216 and the second planetary ring gear 234.

The third clutch 364 may selectively couple the second gear set 202, the third gear set 304, or both to the drive pinion 84. For instance, the support member 252 may be split into two parts, such as a first support member portion 370 and a second support member portion 372 and the third clutch 364 may selectively connect the first support member portion 370 to the second support member portion 372. The first support member portion 370 may be fixedly coupled to and may rotate with the third planetary ring gear 314 while the second support member portion 372 may be coupled to and may rotate with the drive pinion 84. As such, the third clutch 364 may connect the first support member portion 370 to the second support member portion 372 such that the first support member portion 370 and the second support member portion 372 may be rotatable together about the axis 70 when the third clutch 364 is engaged. Conversely, the third clutch 364 may be disengaged to permit relative rotation between the first support member portion 370 and the second support member portion 372. The third clutch 364 is illustrated as being approximately positioned between the first gear set 200 and the second gear set 202; however, other configurations and positioning are contemplated. For instance, the third clutch 364 may be positioned further from the drive pinion 84.

The fourth clutch 366 may selectively couple the second sun gear 230 and the third sun gear 310 to a stationary component. For instance, the fourth clutch 366 may connect the second sun gear 230 and the third sun gear 310 to the gear reduction module housing 170 such that the second sun gear 230 and the third sun gear 310 may be inhibited from rotating about the axis 70. Conversely, the fourth clutch 366 may be disengaged to permit the second sun gear 230 and the third sun gear 310 to rotate together about the axis 70 with respect to the gear reduction module housing 170. The fourth clutch 366 is illustrated as being disposed adjacent to the gear reduction module housing 170; however, the fourth clutch 366 may be provided in other positions, such as closer to the axis 70.

The fifth clutch 368 may selectively couple the third planet gear carrier 316 to a stationary component. For instance, the fifth clutch 368 may connect the third planet gear carrier 316 to the gear reduction module housing 170 such that the third planet gear carrier 316 may be inhibited from rotating about the axis 70. Conversely, the fifth clutch 368 may be disengaged to permit the third planet gear carrier 316 to rotate about the axis 70 with respect to the gear reduction module housing 170. The fifth clutch 368 is illustrated as being disposed adjacent to the gear reduction module housing 170; however, the fifth clutch 368 may be provided in other locations, such as closer to the axis 70.

Referring to FIG. 5, clutching for providing a first gear ratio is illustrated. In at least one configuration, the first gear ratio may be a low-speed gear ratio. The first clutch 360 and the fourth clutch 366 may be disengaged while the second clutch 362, third clutch 364, and the fifth clutch 368 may be engaged. Torque may be transmitted from the rotor 106 to the first sun gear 210 such as via the rotor output flange 150, from the first sun gear 210 to the first planet gear carrier 216 via the first set of planet gears 212, from the first planet gear carrier 216 to the second planetary ring gear 234 via the second clutch 362, from the second planetary ring gear 234 to the second planet gear carrier 236, the second sun gear 230, and the third sun gear 310 via the second set of planet gears 232, from the third sun gear 310 to the third planetary ring gear 314 via the third set of planet gears 312, and from the second planet gear carrier 236 and the third planetary ring gear 314 to the drive pinion 84 via the first support member portion 370, the third clutch 364, and the second support member portion 372. As such, the second sun gear 230, and the third sun gear 310 may be rotatable about the axis 70 with respect to the drive pinion 84 when the first gear ratio is provided.

Referring to FIG. 6, clutching for providing a second gear ratio is illustrated. In at least one configuration, the second gear ratio may be an intermediate or mid-speed gear ratio that may differ from the first gear ratio. The first clutch 360 and the fifth clutch 368 may be disengaged while the second clutch 362, third clutch 364, and fourth clutch 366 may be engaged. Torque may be transmitted from the rotor 106 to the first sun gear 210 such as via the rotor output flange 150, from the first sun gear 210 to the first planet gear carrier 216 via the first set of planet gears 212, from the first planet gear carrier 216 to the second planetary ring gear 234 via the second clutch 362, from the second planetary ring gear 234 to the second planet gear carrier 236 via the second set of planet gears 232, and from the second planet gear carrier 236 to the drive pinion 84 via the first support member portion 370, the third clutch 364, and the second support member portion 372. As such, torque may not be transmitted through the third gear set 304 and the third planet gear carrier 316 may be rotatable about the axis 70 with respect to the drive pinion 84 when the second gear ratio is provided.

Referring to FIG. 7, clutching for providing a third gear ratio is illustrated. In at least one configuration, the third gear ratio may be a high-speed gear ratio that may differ from the first gear ratio in the second gear ratio. The first clutch 360 may be engaged while the second clutch 362, third clutch 364, fourth clutch 366, and fifth clutch 368 may be disengaged. Torque may be transmitted from the rotor 106 to the first sun gear 210 such as via the rotor output flange 150, from the first sun gear 210 to the first planet gear carrier 216 via the first set of planet gears 212, and from the first planet gear carrier 216 to the drive pinion 84 via the first clutch 360 and the second support member portion 372. As such, torque may not be transmitted through the second gear set 202 and the third gear set 304 when the third gear ratio is provided.

It is also contemplated that the configuration in FIGS. 5-7 may be provided with fewer clutches. For instance, the second clutch 362 and the third clutch 364 may be replaced by rigid connections. However, this will result in additional planetary gears rotating in the high-speed gear ratio or when the third gear ratio is engaged, which may increase energy usage.

Figure 8:
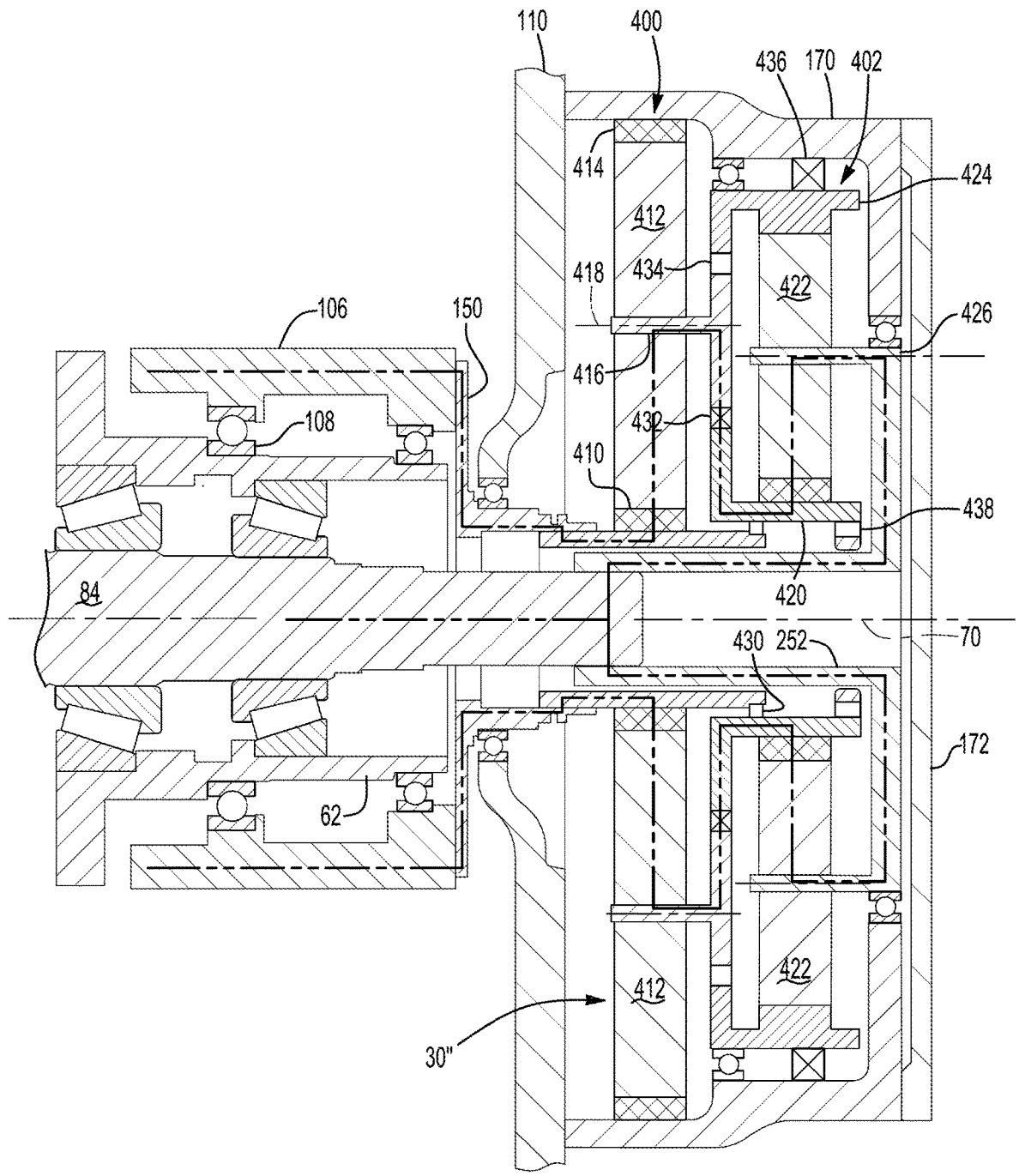
FIG. 8 is a magnified view that shows a third configuration of a gear reduction unit and a torque path associated with a first gear ratio.
Figure 9:
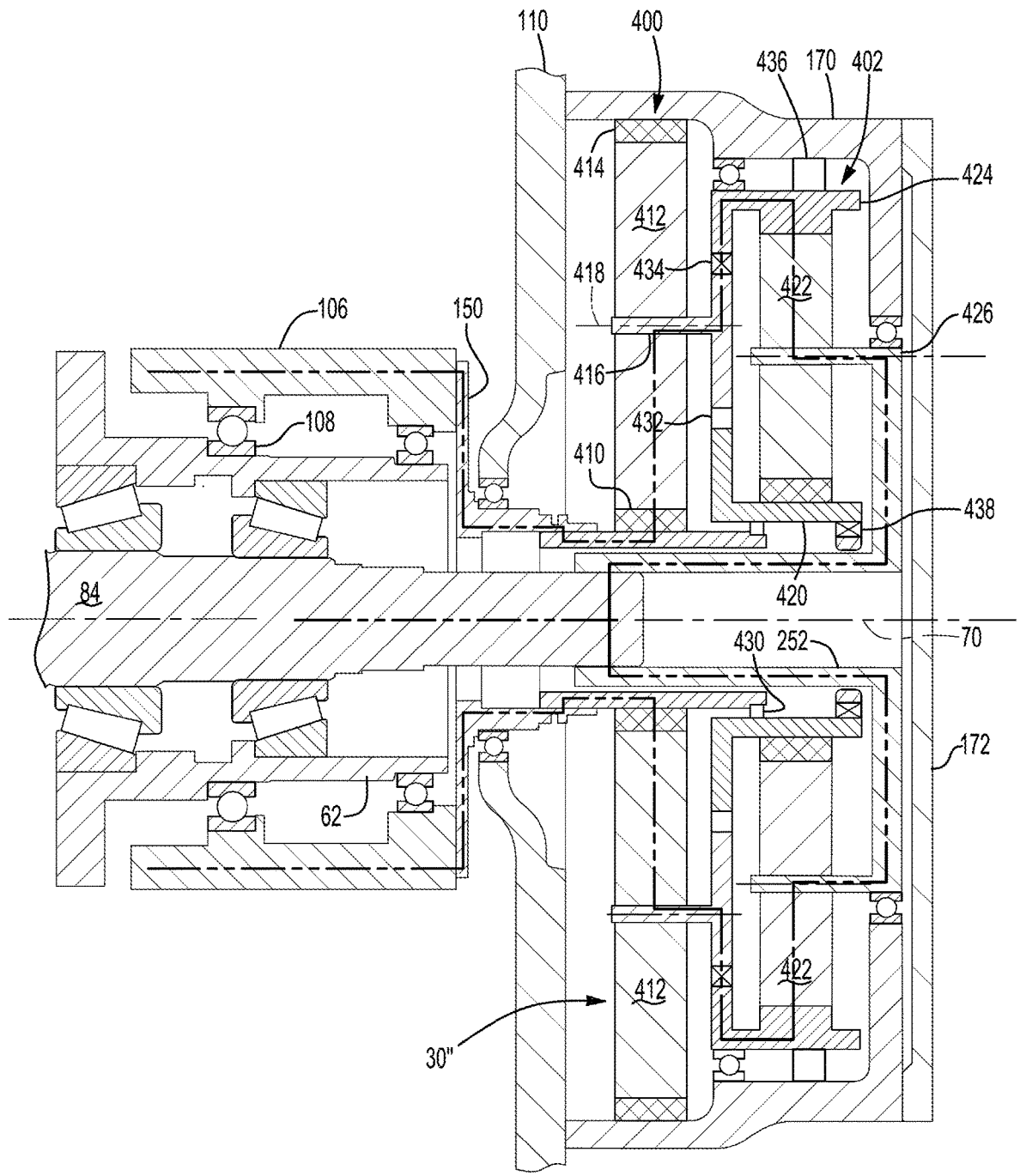
FIG. 9 shows the gear reduction unit of FIG. 8 and a torque path associated with a second gear ratio.
Figure 10:
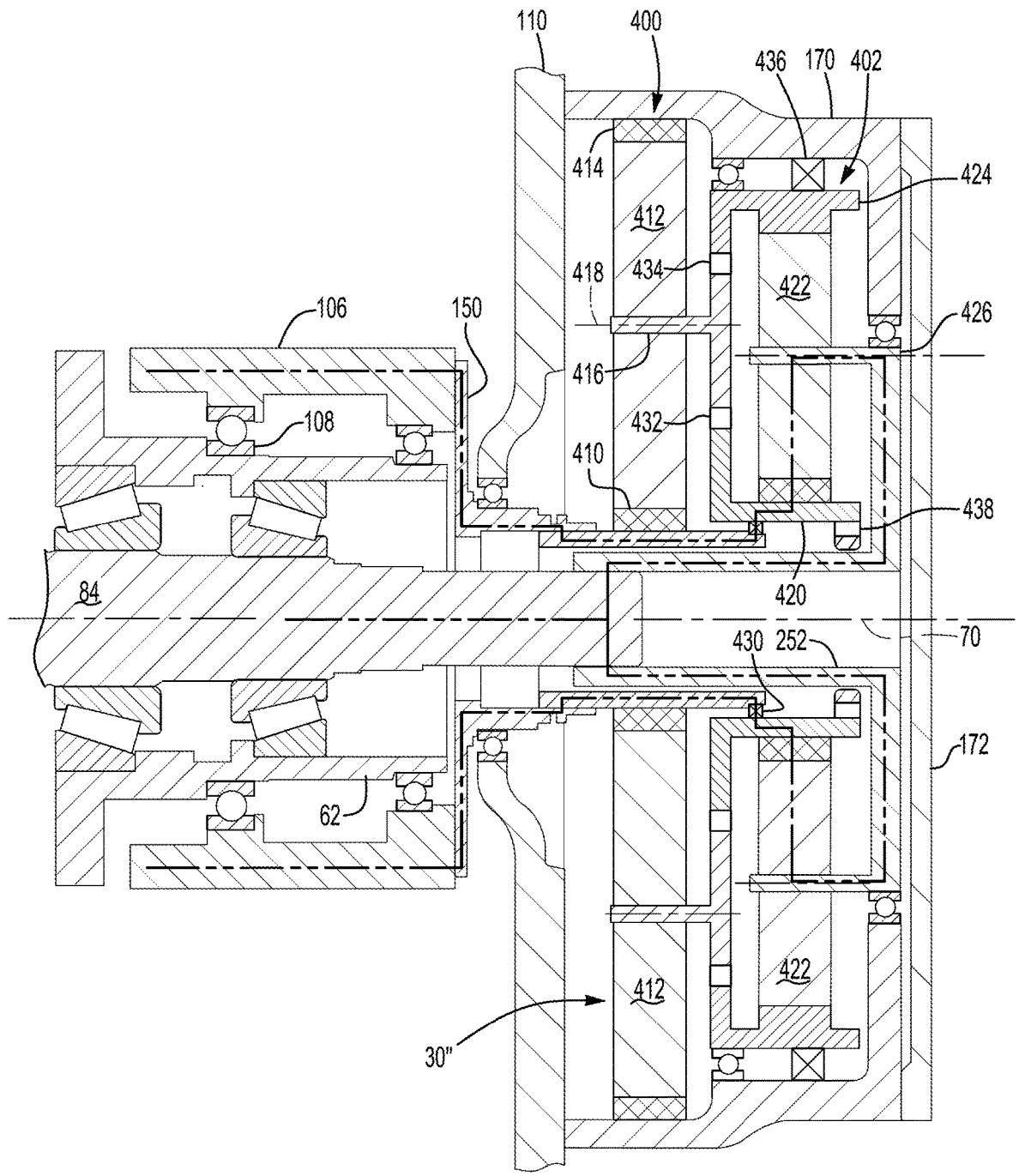
FIG. 10 shows the gear reduction unit of FIG. 8 and a torque path associated with a third gear ratio.

Referring to FIGS. 8-10, a third configuration of a gear reduction module 30" is shown. In this configuration, the gear reduction module 30" may include a first planetary gear set 400 and a second planetary gear set 402.

The first planetary gear set 400 may be axially positioned along the axis 70 between the electric motor module 26 and the second planetary gear set 402. In at least one configuration, the first planetary gear set 400 may include a first sun gear 410, a first set of planet gears 412, a first planetary ring gear 414, and a first planet gear carrier 416.

The first sun gear 410 may be operatively connected to the rotor 106. For instance, the first sun gear 410 may be operatively connected to the rotor 106 via the rotor output flange 150. As such, the first sun gear 410 may be rotatable about the axis 70 with the rotor 106 and the rotor output flange 150. The first sun gear 410 may extend around and may receive the drive pinion 84 depending on the length of the drive pinion 84.

The first set of planet gears 412 may be rotatably disposed between the first sun gear 410 and the first planetary ring gear 414. Each first planet gear 412 may have teeth that may mesh with teeth of the first sun gear 410 that may extend away from the axis 70 and with teeth of the first planetary ring gear 414 that may extend toward the axis 70. In addition, each first planet gear 412 may be rotatable about a corresponding planet gear axis 418.

The first planetary ring gear 414 may extend around the axis 70 and may receive the first set of planet gears 412. The first planetary ring gear 414 may be fixedly positioned such that the first planetary ring gear 414 is not rotatable about the axis 70. For instance, the first planetary ring gear 414 may be received inside and may be fixedly coupled to a stationary component, such as the gear reduction module housing 170 such that the first planetary ring gear 414 may not be rotatable about the axis 70.

The first planet gear carrier 416 may rotatably support the first set of planet gears 412. In addition, the first planet gear carrier 416 may be rotatable about the axis 70. The first planet gear carrier 416 may extend toward and may be operatively connectable to the second planetary gear set 402.

The second planetary gear set 402 may be axially positioned along the axis 70 further from the electric motor module 26 than the first planetary gear set 400. In at least one configuration, the second planetary gear set 402 may include a second sun gear 420, a second set of planet gears 422, a second planetary ring gear 424, and a second planet gear carrier 426.

The second sun gear 420 may be selectively coupled to a stationary component via a fifth clutch as will be discussed below.

The second set of planet gears 422 may be rotatably disposed between the second sun gear 420 and the second planetary ring gear 424. Each second planet gear 422 may have teeth that may mesh with teeth of the second sun gear 420 that may extend away from the axis 70 and with teeth of the second planetary ring gear 424 that may extend toward the axis 70. In addition, each second planet gear 422 may be rotatable about a corresponding planet gear axis, which may differ from the planet gear axes 418 associated with the first set of planet gears 412.

The second planetary ring gear 424 may extend around the axis 70 and may receive the second set of planet gears 422. The second planetary ring gear 424 may be selectively coupled to a stationary component, such as the gear reduction module housing 170.

The second planet gear carrier 426 may rotatably support the second set of planet gears 422. In addition, the second planet gear carrier 426 may be rotatable about the axis 70. The second planet gear carrier 426 may be fixedly coupled to or integrally formed with the support member 252.

Referring to FIG. 8, five clutches are illustrated. These clutches may be referred to as a first clutch 430, a second clutch 432, a third clutch 434, a fourth clutch 436, and a fifth clutch 438.

The first clutch 430 may selectively couple the first sun gear 410 to the second sun gear 420. As such, the first clutch 430 may function to selectively couple the rotor 106 to the second sun gear 420. For instance, the first clutch 430 may connect the first sun gear 410 to the second sun gear 420 such that the first sun gear 410 and the second sun gear 420 may be rotatable together about the axis 70 when the first clutch 430 is engaged. Conversely, the first clutch 430 may be disengaged to permit relative rotation between the first sun gear 410 and the second sun gear 420.

The second clutch 432 may selectively connect the first planet gear carrier 416 to the second sun gear 420. For instance, the second clutch 432 may connect the first planet gear carrier 416 to the second sun gear 420 such that the first planet gear carrier 416 and the second sun gear 420 may be rotatable together about the axis 70 when the second clutch 432 is engaged. Conversely, the second clutch 432 may be disengaged to permit relative rotation between the first planet gear carrier 416 and the second sun gear 420.

The third clutch 434 may selectively connect the first planet gear carrier 416 to the second planetary ring gear 424. For instance, the third clutch 434 may connect the first planet gear carrier 416 to the second planetary ring gear 424 such that the first planet gear carrier 416 and the second planetary ring gear 424 may be rotatable together about the axis 70 when the third clutch 434 is engaged. Conversely, the third clutch 434 may be disengaged to permit relative rotation between the first planet gear carrier 416 and the second planetary ring gear 424.

The fourth clutch 436 may control rotation of the second planetary ring gear 424 about the axis 70. For instance, the fourth clutch 436 may connect the second planetary ring gear 424 to a stationary component, such as the gear reduction module housing 170, such that the second planetary ring gear 424 may not be rotatable about the axis 70 when the fourth clutch 436 is engaged. Conversely, the fourth clutch 436 may be disengaged to permit the second planetary ring gear 424 to rotate about the axis 70 with respect to the gear reduction module housing 170.

The fifth clutch 438 may control rotation of the second sun gear 420 about the axis 70. For instance, the fifth clutch 438 may connect the second sun gear 420 to a stationary component, such as the gear reduction module housing 170, such that the second sun gear 420 may not be rotatable about the axis 70 when the fifth clutch 438 is engaged. Conversely, the fifth clutch 438 may be disengaged to permit the second sun gear 420 to rotate about the axis 70 with respect to the gear reduction module housing 170.

Referring to FIG. 8, clutching for providing a first gear ratio is illustrated. In at least one configuration, the first gear ratio may be a low-speed gear ratio. The first clutch 430, third clutch 434, and fifth clutch 438 may be disengaged while the second clutch 432 and the fourth clutch 436 may be engaged. Torque may be transmitted from the rotor 106 to the first sun gear 410 such as via the rotor output flange 150, from the first sun gear 410 to the first planet gear carrier 416 via the first set of planet gears 412, from the first planet gear carrier 416 to the second sun gear 420 via the second clutch 432, from the second sun gear 420 to the second planet gear carrier 426 via the second set of planet gears 422, and from the second planet gear carrier 426 to the drive pinion 84 via the support member 252, noting that the support member 252 may be integrally formed with the second planet gear carrier 426 or attached as a separate component. As such, the first sun gear 410 and the second sun gear 420 may be rotatable about the axis 70 with respect to the drive pinion 84 and may be rotatable at different speeds with respect to each other when the first gear ratio is provided.

Referring to FIG. 9, clutching for providing a second gear ratio is illustrated. In at least one configuration, the second gear ratio may be an intermediate or mid-speed gear ratio that may differ from the first gear ratio. The third clutch 434 and the fifth clutch 438 may be engaged while the first clutch 430, second clutch 432, and fourth clutch 436 may be disengaged. Torque may be transmitted from the rotor 106 to the first sun gear 410 such as via the rotor output flange 150, from the first sun gear 410 to the first planet gear carrier 416 via the first set of planet gears 412, from the first planet gear carrier 416 to the second planetary ring gear 424 via the third clutch 434, from the second planetary ring gear 424 to the second planet gear carrier 426 via the second set of planet gears 422, and from the second planet gear carrier 426 to the drive pinion 84 via the support member 252. As such, the first sun gear 410 but not the second sun gear 420 may be rotatable about the axis 70 with respect to the drive pinion 84 when the second gear ratio is provided.

Referring to FIG. 10, clutching for providing a third gear ratio is illustrated. In at least one configuration, the third gear ratio may be a high-speed gear ratio that may differ from the first gear ratio and the second gear ratio. The first clutch 430 and the fourth clutch 436 may be engaged while the second clutch 432, third clutch 434, and fifth clutch 438 may be disengaged. Torque may be transmitted from the rotor 106 to the first sun gear 410 such as via the rotor output flange 150, from the first sun gear 410 to the second sun gear 420 via the first clutch 430, from the second sun gear 420 to the second planet gear carrier 426 via the second set of planet gears 422, and from the second planet gear carrier 426 to the drive pinion 84 via the support member 252. As such, the first sun gear 410 and the second sun gear 420 may be rotatable at the same speed about the axis 70 with respect to the drive pinion 84 when the third gear ratio is provided.

Referring to FIG. 1, the axle assembly 10 may optionally include an isolator support 500. The isolator support 500 may help support the end of the axle assembly 10 that is disposed furthest from the axle housing 40 and the differential axis 80. In at least one configuration, the isolator support 500 may extend from the gear reduction module housing 170 or the gear reduction module cover 172 to a cross beam 502 that may be part of the chassis of the vehicle. For instance, the cross beam 502 may extend in a lateral direction between two frame rails of the vehicle. The isolator support 500 may include a first portion 504 that may be mounted on the gear reduction module housing 170 or the gear reduction module cover 172 and a second portion 506 that may be mounted to the cross beam 502. The isolator support 500 may allow the first portion 504 to pivot about an isolator mount axis 508 with respect to the second portion 506 and may help limit movement and acceleration of the gear reduction module housing 170. For example, it is contemplated that a portion of the isolator support 500 may include a resilient member that may be received in a hole in the first portion 504, the second portion 506 or both. It is also contemplated that the first portion 504 or the second portion 506 may be configured as a shock absorber. The isolator support 500 may be provided with any of the configurations previously discussed.

An axle assembly having gear set configurations as described above may provide multiple gear ratios or multiple speeds while providing a more compact package space. Moreover the gear set configurations may allow the difference between gear ratios to be reduced as compared to a two-speed single planetary gear configuration, which may help improve efficiency of the gear reduction unit and drivability of the vehicle. In addition, the configurations described above may allow each gear ratio to be a gear reduction with respect to the rotor speed, which may help reduce the rotational speed of the gear sets and helping reduce heating of the roller bearing assemblies associated with the gear sets and improve bearing life.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an electric motor having a rotor that is rotatable about an axis;
   a drive pinion that extends through the rotor and is rotatable about the axis;
   a gear reduction unit that includes:
      a first gear set that has a first sun gear that is operatively connected to the rotor and is rotatable about the axis with the rotor, a first planetary ring gear that is fixedly positioned such that the first planetary ring gear is not rotatable about the axis, a first set of planet gears that meshes with the first sun gear and the first planetary ring gear, and a first planet gear carrier that rotatably supports the first set of planet gears; and
      a second gear set that has a second sun gear, a second planetary ring gear that is couplable to the first planet gear carrier such that the first planet gear carrier and the second planetary ring gear are rotatable together about the axis, a second set of planet gears that meshes with the second sun gear and the second planetary ring gear, and a second planet gear carrier that rotatably supports the second set of planet gears and that is rotatable about the axis;
   a first clutch that selectively couples the first planet gear carrier to the drive pinion; and
   a second clutch that selectively couples the first planet gear carrier to the second gear set.

2. The axle assembly of claim 1 wherein the first gear set is axially positioned along the axis between the electric motor and the second gear set.

3. The axle assembly of claim 1 wherein members of the first set of planet gears have a smaller diameter than members of the second set of planet gears.

4. The axle assembly of claim 1 wherein the second planet gear carrier is operatively connected to the drive pinion such that the second planet gear carrier does not rotate with respect to the drive pinion.

5. The axle assembly of claim 1 wherein the first clutch does not couple the first planet gear carrier to the drive pinion when the second clutch couples the first planet gear carrier to the second gear set and the second clutch does not couple the first planet gear carrier to the second gear set when the first clutch couples the first planet gear carrier to the drive pinion.

6. The axle assembly of claim 1 wherein the second sun gear is fixedly positioned such that the second sun gear is not rotatable about the axis.

7. The axle assembly of claim 1 wherein the second clutch selectively couples the first planet gear carrier to the second planetary ring gear.

8. The axle assembly of claim 1 further comprising a third gear set that includes:
   a third sun gear that is fixedly positioned with respect to the second sun gear;
   a third planetary ring gear that is rotatable about the axis;
   a third set of planet gears that meshes with the third sun gear and the third planetary ring gear; and
   a third planet gear carrier that rotatably supports the third set of planet gears and that is selectively rotatable about the axis.

9. The axle assembly of claim 8 further comprising:
   a third clutch that selectively connects the third planetary ring gear to the drive pinion;
   a fourth clutch that controls rotation of the second sun gear and the third sun gear about the axis; and
   a fifth clutch that controls rotation of the third planet gear carrier about the axis.

10. The axle assembly of claim 9 wherein torque is transmitted between the electric motor and the drive pinion via the first gear set and the second gear set when the second clutch couples the first planet gear carrier to the second gear set, the third clutch connects the third planetary ring gear to the drive pinion, and the fifth clutch locks the third planet gear carrier such that the third planet gear carrier does not rotate about the axis.

11. The axle assembly of claim 10 wherein the first clutch does not connect the first planet gear carrier to the drive pinion and the fourth clutch unlocks the second sun gear and the third sun gear such that the second sun gear and the third sun gear are rotatable about the axis.

12. The axle assembly of claim 9 wherein torque is transmitted between the electric motor and the drive pinion via the first gear set and the second gear set when the second clutch couples the first planet gear carrier to the second gear set, the third clutch connects the third planetary ring gear to the drive pinion, and the fourth clutch locks the second sun gear and the third sun gear such that the second sun gear and the third sun gear do not rotate about the axis.

13. The axle assembly of claim 12 wherein the first clutch does not connect the first planet gear carrier to the drive pinion and the fifth clutch permits the third planet gear carrier to rotate about the axis.

14. The axle assembly of claim 9 wherein torque is transmitted between the electric motor and the drive pinion via the first gear set when the first clutch connects the first planet gear carrier to the drive pinion.

15. The axle assembly of claim 14 wherein the second clutch does not couple the first planet gear carrier to the second gear set and the third clutch does not connect the third planetary ring gear to the drive pinion.

* * * * *